B. B. MOSS.
VEHICLE WHEEL.
APPLICATION FILED JULY 21, 1910.
1,059,194. Patented Apr. 15, 1913.
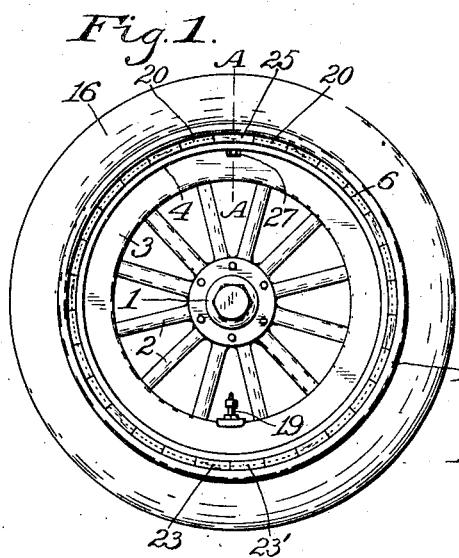
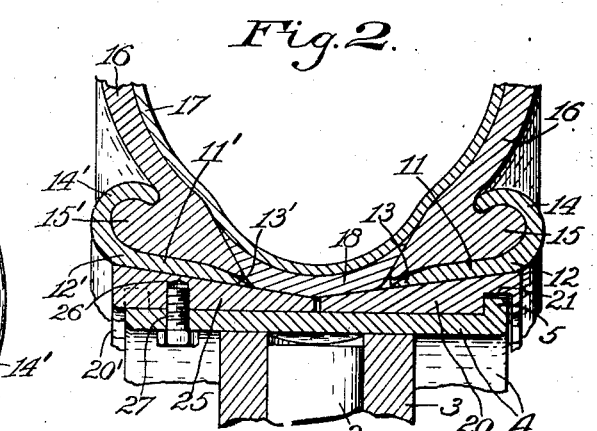
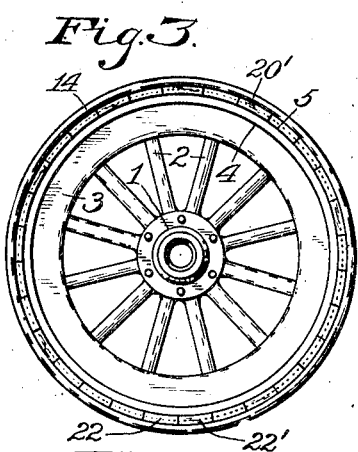
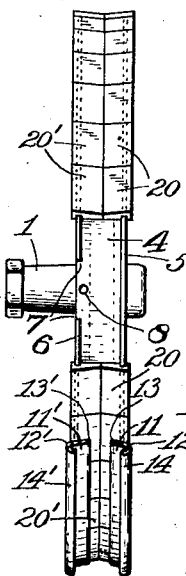
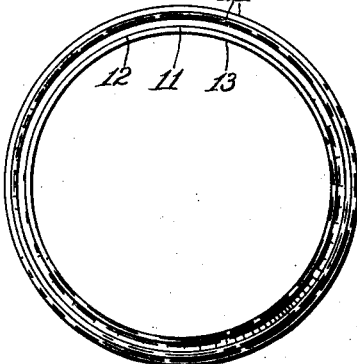
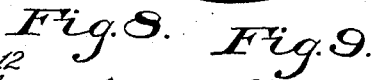
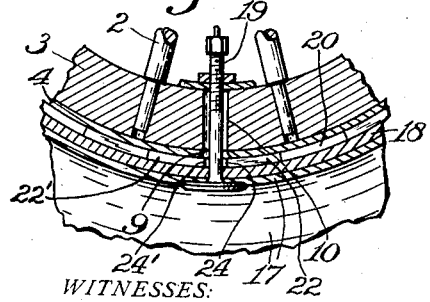
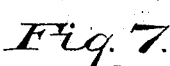
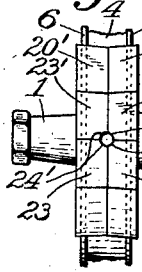
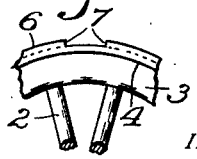
WITNESSES:
J. H. Gardner
K. R. Woddell
INVENTOR:
Bertie B. Moss,
BY
E. F. Silvius,
ATTORNEY.

UNITED STATES PATENT OFFICE.

BERTIE B. MOSS, OF SALEM, INDIANA, ASSIGNOR OF ONE-FOURTH TO GUS SIMS AND ONE-FOURTH TO JOSEPH LENNES, BOTH OF INDIANAPOLIS, INDIANA.

VEHICLE-WHEEL.

1,059,194.

Specification of Letters Patent.

Patented Apr. 15, 1913.

Application filed July 21, 1910. Serial No. 572,975.

*To all whom it may concern:*

Be it known that I, BERTIE B. MOSS, a citizen of the United States, residing at Salem, in the county of Washington and State of Indiana, have invented certain new and useful Improvements in Vehicle-Wheels; and I do declare the following to be a full, clear, and exact description of the invention, reference being had to the accompanying drawings, and to the letters and figures of reference marked thereon,which form a part of this specification.

This invention relates to pneumatic tired wheels and has reference more particularly to wheels that are adapted to permit pneumatic tires that comprise an inner tube and a casing to be quickly removed from the wheel or placed thereon.

The object of the invention is to provide an improved automobile or similar vehicle wheel that will be adapted to securely hold pneumatic or other tires thereon, and permit the tires to be quickly removed for repairs, or permit of the release of one side of the tire casing so that the inner tube may be accessible in order to repair punctures; another object being to provide a vehicle wheel that will permit of quick changes of tires, and of such construction that the removable parts will not be liable to stick fast to the extent of rendering it difficult to change the tires, a still further object being to provide a wheel of the above-mentioned character that will be adapted to be constructed at relatively small cost and be reliable, durable and economical in use, and especially adapted to permit of changing tires without requiring special tools in so doing.

The invention consists essentially in a wheel comprising a metallic rim member having two flanges or ribs or the equivalent thereof on its periphery, two oppositely disposed clencher rings of larger diameter than the rim member adapted to have a tire casing connected thereto, and two sectional filling rings having grooves therein to receive the flanges or ribs and placed between the rim member and the clencher rings, the filling rings being held in place partly by means of the grooves and the flanges or ribs and partly by the clencher rings, the filling rings being locked to the rim member and retaining the clencher rings in the required positions for retaining the pneumatic tire.

The invention consists also in certain novel parts, and in the combinations and arrangements of parts, as hereinafter particularly described and claimed.

Referring to the drawings, Figure 1 is an elevation of the outer side of the improved wheel and a pneumatic tire thereon; Fig. 2, a fragmentary transverse sectional view on the line A A in Fig. 1; Fig. 3, an elevation of the inner side of the wheel without the tire; Fig. 4, a peripheral plan view of the wheel with parts thereof omitted and the clencher rings broken away; Fig. 5, an elevation of the inner side of one of the clencher rings; Fig. 6, a fragmentary sectional view of the wheel at the inflating nipple; Fig. 7, a fragmentary view similar to Fig. 4, but representing the opposite portion of the wheel; Fig. 8, a perspective view of the key comprising one section of a filling ring; Fig. 9, a perspective view of one of the main sections of the filling ring; Fig. 10, a fragmentary view of the wheel, especially the felly; and Fig. 11, a perspective view of one of the sections of either filling ring adapted to be used adjacent to the inflating nipple of the tire.

Similar reference characters in the different figures of the drawings indicate corresponding elements or features of construction therein referred to.

In the drawings the numeral 1 indicates the hub; 2, the spokes; and 3, the felly proper of the wheel which may be constructed in any well known or desired manner as to details, and the felly being preferably of wood is provided with a metallic rim member 4. The rim member 4 is continuous and constitutes an essential part of the invention, the two opposite edge portions thereof having each a flange or rib thereon, the flange or rib 5 that is on the inner side of the wheel being preferably continuous, and the flange or rib 6 on the outer side of the wheel having a gap 7 therein. The member 4 has a bolt hole 8 therein in the plane between the ends of the rib 6, and the opposite portion of the member 4 has an aperture 9 therein registering with an aperture 10 in the felly 3 to receive the inflating nipple of the tire. The member 4 is broader than the felly, so that the bolt-hole 8 is accessible at the outer side of the felly.

Two identical clencher rings 11 and 11' are provided that are continuous and of suitable width to afford a substantial seat for the tire casing. The outer portions 12 and 12' are greater in diameter than the inner portions 13 and 13' of the rings respectively, so that each ring is conical and extends about the rim member 4, being sufficiently large to pass over the flanges or ribs thereon. The clencher rings have rolled-over flanges 14 and 14' respectively adapted to be engaged by the ribs 15 and 15' on the edges of the tire-casing 16 which retains the inner tube 17, and it will be understood that the flanges 14 and 14' may be made of any suitable contour to correspond to such tire casing as may be preferred, there being usually a protecting band 18 between the edges of the tire casing and against the outer side of the inner tube, the latter having an inflating nipple 19. Two sectional filling rings are inserted between the rim member 4 and the clencher rings, the sectional ring at the inner side of the wheel being composed of a suitable number of identical sections 20, each section being concavo-convex, so as to conform to the curvature of the periphery of the member 4 and the inner side of the clencher ring 11, and the inner side of each section 20 has a groove 21 therein to receive the flange 5.

The clencher ring 11 may be placed approximately on the middle portion of the member 4 and then the sections 20 may be placed in position, after which the ring 11 is moved outward until it becomes wedged tightly on the sectional filling ring, each section 20 being tapering so as to perform the function of a wedge, the outer end portion of which that has the groove therein being the thicker portion. The ring 11 ordinarily need not be disarranged after having been locked in position.

Two of the sections 22 and 22' which are intended to be placed at the inflating nipple are slightly modified as are also two sections 23 and 23' of the opposite sectional filling ring in that each has a recessed corner 24 or 24' to afford clearance for the inflating nipple. Besides the sections 23 and 23' the forward sectional filling ring is composed of main sections 20' (which are exactly like the sections 20) and a key section 25 which is inserted through the gap 7 after the other sections are placed in position and secured in any suitable manner, the section 25 preferably having a threaded hole 26 therein in which is inserted a cap-screw 27 which secures the section 25 to the member 4 and locks the remaining sections, so that they can not move along the periphery of the member 4. The section 25 is wedge shaped and substantially like the main sections but need not have the groove 21 therein. When inserting the sections it will be understood, of course, that the ring 11' is moved inward slightly toward the opposite ring 11, so that the sections may be moved freely between the member 4 and the ring 11', and then the ring 11' should be moved outward until it binds tightly against the segments of the filling ring. It will be understood, of course, that the tire and its casing should be placed in position before the sectional filling ring at the front of the wheel is placed in position between the ring 11' and the member 4.

It will be apparent from the foregoing that when the tire is inflated the air pressure will tend to spread the tire and necessarily must force the clencher rings 11 and 11' apart, and the greater the pressure of air the tighter the clencher rings will become seated on the sectional filling rings.

It should be understood that if desired the sectional filling ring in the clencher ring 11 may be constructed with a key section as is the outer or forward filling ring in the ring 11'. It should be understood further that the sectional filling rings are preferably of sufficient width so as to be in contact at the middle plane of the wheel in order to form a seat for the pneumatic tire, but obviously might be somewhat shorter if desired, and it is apparent also that grooves would be equivalent to the flanges or ribs 5 and 6, and ribs to enter the groove would be equivalent to the grooves 21 in the segments of the filling rings, the preferred construction, however, being such as specifically described.

In practical use when necessary to remove a tire or to uncover the inner tube in order to mend it, the tire is first deflated partially, if not entirely so through a puncture, and after removing the screw 27 the key 25 is withdrawn and then the wheel is turned so that the gap 7 is lowermost, and the ring 11' is pushed over slightly toward the opposite ring 11 after which the sections of the filling ring are moved from opposite sides of the inflating nipple and removed through the gap 7, after which the clencher ring 11' is freely moved over the flange 6, so that the outer portion of the tire casing is released. When necessary to remove the tire entirely it will be apparent that it may be drawn forward until entirely removed. In order to replace the tire or place a new one on the wheel it may be readily slipped over the ring 11, and then the ring 11' may be placed in position, after which the sections 23 and 23' are first placed in position followed by the other sections, and then the key section 25 is inserted and secured in position.

Having thus described the invention, what is claimed as new, is—

In a vehicle wheel, the combination of a continuous annular rim member having a continuous external flange on one edge and an external flange that has a gap therein on the opposite edge thereof, the member having an aperture and also a bolt hole therein in a plane between the ends of the flange that has the gap, two counterpart rings extending about said rim member and said flanges with their inner edges spaced apart, said edges being beveled and oppositely arranged, the inner portions of said rings being less in diameter than the outer portions thereof, a plurality of filling ring sections interposed between said member and one of said counterpart rings and having each a transverse groove receiving a portion of said continuous flange, a plurality of filling ring sections interposed between said member and the remaining one of said counterpart rings, each excepting one of said last described sections having a transverse groove receiving a portion of said flange that has the gap, said excepted one of said sections being devoid of the groove and having a threaded bolt hole therein, each one of said sections being wedge-shaped and arranged with the thinner ends innermost, the thinner ends of the second described sections being adjacent to the thinner ends of the first described sections, four adjacent corners of the thinner ends of four of said sections respectively being recessed at said aperture, each of said sections being slightly less in width than the gap in said flange, said section that has the bolt hole normally extending into said gap, and a threaded bolt secured in said bolt holes.

In testimony whereof, I affix my signature in presence of two witnesses.

BERTIE B. MOSS

Witnesses:
   E. T. SILVIUS,
   K. R. WODDELL.